May 19, 1964    E. REED    3,133,568
BIT END OF TOOL FOR DRIVING SCREW FASTENER
Filed April 2, 1962
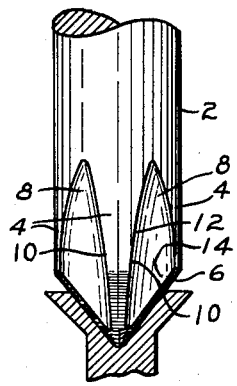
Fig. 1
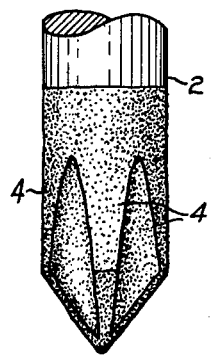
Fig. 2
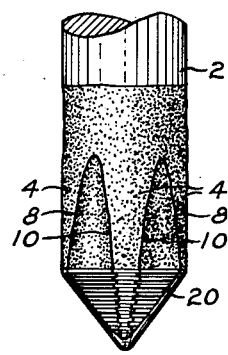
Fig. 3
Fig. 4
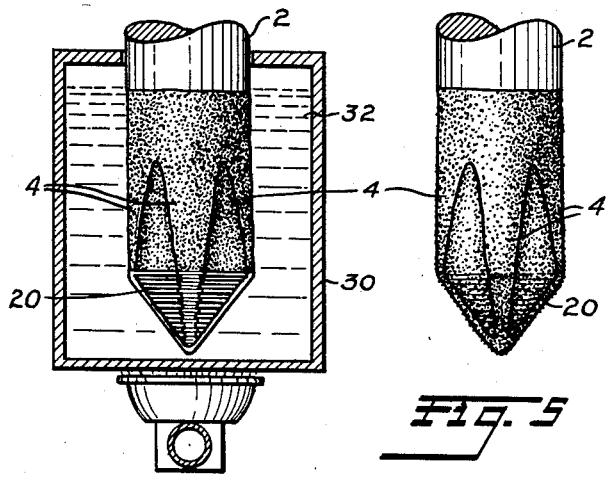
Fig. 5
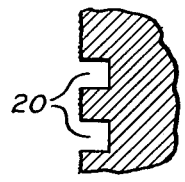
Fig. 6
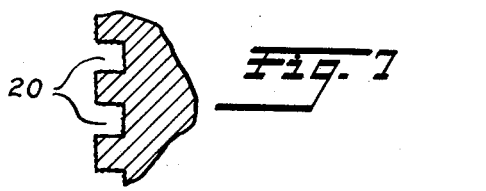
Fig. 7
INVENTOR
EDGAR REED
BY Scrivener & Parker
ATTORNEYS United States Patent Office 3,133,568
Patented May 19, 1964

3,133,568
BIT END OF TOOL FOR DRIVING
SCREW FASTENER
Edgar Reed, Worcester, Mass., assignor to Reed & Prince
Manufacturing Company, Worcester, Mass., a corporation of Massachusetts
Filed Apr. 2, 1962, Ser. No. 184,214
3 Claims. (Cl. 145—50)

This application is a continuation-in-part of my copending application Serial No. 142,719, filed October 3, 1961, now abandoned, for Bit End of Tool for Driving Screw Fasteners.

This invention relates to threaded fasteners such as screws and to tools for turning such fasteners to drive them into wood, metal or other material in their normal and intended use.

All screw fasteners of the type with which the tool provided by this invention is to be used comprise a threaded shank having a head which is provided in its upper surface with a slot or recess to receive a tool by which the fastener is turned about its axis. The shank and thread of such a fastener may have any shape or construction, the head may be flat, round, oval or be of any other desired type or shape, and the tool receiving recess may be of any desired type, such as the well-known diametrical slot or the Reed & Prince (or Frearson) recess or the Phillips recess. These parts of a known and conventional screw are not modified or changed in any way by this invention.

When a screw having a slotted or recessed head is to be turned in order to drive it into some material the bit end of the driving tool is inserted into the slot or recess in the head in order to provide a driving connection between the tool and the fastener. As the threaded shank of the fastener increases its penetration of the material into which the fastener is being driven, the torque applied to the walls of the slot or recess in the head increases greatly, and the reaction of these walls on the tool tends to force the tool out of the slot or recess. This is a very common phenomenon and when it occurs the tool is said to "back off" from the slot or recess in the head. This "backing off" causes damage to the tool and to the walls of the slot or recess in the head and also requires that additional force be exerted on the tool in a direction toward the head in order to insure that the tool and screw will not be separated and that sufficient driving torque will be imparted to the fastener by the tool.

This invention has for its principal object the provision of a driving tool having a bit end for insertion into the slot or recess in the head of a screw fastener to impart turning movement thereto, which bit end is so constructed that it provides maximum resistance to forces tending to force it from the slot or recess in the screw fastener head, thus eliminating "backing off" or reducing it to a minimum.

The invention is described in this specification as applied to, and in the construction of, a driving tool for a recessed head screw having a four-arm recess, but it will be understood that this description is only for purposes of illustration and that the invention is equally applicable in the manufacture and construction of a driving tool for a slotted head, three arm recess, or other type of screw head recess.

An embodiment of the invention is described more in detail in the following specification, which is accompanied by a drawing in which:

FIG. 1 is a side elevational view of the bit end of a tool for driving a threaded fastener, the tool being shown in driving engagement with the fastener before any treatment in accordance with this invention;

FIG. 2 is a side elevational view of the bit end of the tool shown in FIG. 1, after shot peening, which is the first step of the preferred method according to the invention;

FIG. 3 is a view which is similar to FIG. 2, showing the bit end after the completion of scoring, which is the second step of the prefererd treatment according to the invention;

FIG. 4 is a view illustrating the next step in the preferred method, this being the heat treatment of the peened and scored bit end;

FIG. 5 is a view showing the bit end of the tool after the next step in the preferred method, which is the second shot peening;

FIG. 6 is an enlarged view showing one form which the score lines shown in FIG. 3 may take, and FIG. 7 is a view which is similar to FIG. 6 but shows the score lines after the final step of the preferred treatment according to the invention.

A tool for turning a screw fastener is illustrated in the drawings and comprises an elongated shank 2, to one end of which a handle (not shown) is attached. The driving end of the tool is provided with four vanes 4 which are equally spaced about the axis of the shank and the outer surfaces of which converge toward the tip end of the shank, as shown at 6. The side faces 8, 10 of each vane are either parallel to each other or converge slightly toward the tip end of the tool and are equally spaced on opposite sides of a radius of the shank, the radii bisecting opposite vanes constituting a diametrical line through the axis of the shank. Thus, adjacent faces of adjacent vanes, such as those indicated at 12, 14, are at approximately a right angle to each other. Such a bit end of a driving tool will be accommodated in the driving recess in the head of a Reed & Prince (Frearson) or Phillips screw, although the shapes of these two types of recess are different and the bit end must be modified accordingly. This, however, does not affect the invention in any way.

In accordance with the preferred practice of the invention the entire bit end of the driving tool is first subjected to surface impacting by shot peening or, as it is sometimes called, shot blasting. This metal working procedure or technique is well known per se and need not be further described here, and a bit end so peened is shown in FIG. 2 of the drawings. The shot peening roughens and cold forges all parts and surfaces of the bit end, compressing the grain structure and increasing the density of the surface layers. The peening also has a cutting action and the bit end may therefore be initially made slightly oversize in all dimensions so that the shot peening reduces the bit end to the final designed dimensions.

After being shot peened, the peened side faces 8, 10 of each vane 4 of the bit end are scored with parallel lines 20 which are very close together and each of which preferably extends at approximately a right angle to the axis of the shank 2, and may extend entirely across each side face of each vane or only partially across each side face. As shown in FIG. 3 the score lines are cut into the peened surface and cover each vane from the tip, or pointed end, thereof for a distance at least equal to the depth of the screw head recess into which the bit end of the tool will be inserted. These score lines may be formed or produced in any desired manner and scores having a depth of approximately 0.004 inch have been found to produce very good results.

After the score lines 20 are formed the entire bit end of the tool is heat treated, as indicated in FIG. 4 of the drawings. As an example, this heat treatment may be carried out in a gas fired pot furnace 30 by heating the entire tool in a neutral salt 32 which does not produce scale and which may be Houghton Liquid Heat 1145. The heating may be continued for five minutes at 1630° F. to produce good results and the bit end is then cooled by quenching in oil at 75° F. to 140° F. The roughness produced by peening and scoring is retained after heating in a neutral salt which does not produce scale. If scale was produced the roughness of the bit end would flake off with the scale.

Following the heat treatment the bit end is again shot peened. This step increases the hardness of the outer peened surface by about 1½ points on the Rockwell C scale, thus increasing wear resistance without increasing brittleness, which would be increased if the hardness of the core of the bit was equally increased. In other words, the treatment increases the hardness of the surface layer while retaining the toughness of the core.

The steps of shot peening before and after heat treatment constitute two cold forging operations because in both shot peening steps the surface metal of the bit end is moved and worked, producing a rough surface before heat treatment and a rough surface with increased hardness after heat treatment.

As illustrated in FIG. 6, the inner surfaces of the score lines 20 are smooth before the heat treating and final shot peening steps but, as shown in FIG. 7, are roughened by these steps. A bit end shot peened, scored, heat treated and shot peened in the described manner has maximum resistance to "backing out" and in some cases cannot be pulled from the screw head recess after torque is applied to it and turning of the screw fastener is subjected to great resistance. The resistance to "backing out" of a bit end formed and treated in accordance with the preferred method of this invention is of a different and higher order than that of a bit end which has only been scored and is immeasurably greater than that of a bit end which has not even been scored.

While the preferred method and embodiment provided by the invention are described above, it is within the scope of the invention to omit the first shot peening step and the heat treating step, in which case the steps provided by the invention would be scoring and then peening. Further, while it is preferred that all of the side faces of the recesss-engaging parts of the bit end of the tool be treated in the manner taught by this invention in order to secure maximum resistance to "backing out," good results may be obtained by so treating a lesser number of such faces.

While certain embodiments of my invention and certain ways in which it is intended to be performed have been described and illustrated, it will be apparent to those skilled in the arts to which it relates that other embodiments and method steps, as well as modifications of those disclosed, may be made and practiced without departing in any way from the spirit or scope of the invention, for the limits of which reference must be made to the appended claims.

What is claimed is:

1. A driving tool for turning recess head screw fasteners such as screws, said tool having a shank having a bit end, said bit end comprising a plurality of vanes extending substantially radially of the shank and each having side faces, said vanes converging to a point at their free ends, at least some of said side faces of the vanes being formed with parallel score lines extending approximately at right angles to the axis of the shank, said bit end having been subjected to heat treatment and shot peening after formation of said score lines.

2. In the manufacture of a driving tool having a shank with a bit end for reception in the recess in the head of a screw fastener, the steps to produce maximum resistance to "backing out" as the tool applies torque to a screw fastener which consist in shot peening the bit end, scoring the bit end with parallel lines extending substantially at right angles to the axis of the shank, then heat treating at least the bit end of the tool, and then shot peening the bit end.

3. In the manufacture of a driving tool having a shank with a bit end for reception in the recess in the head of a screw fastener, the steps to produce maximum resistance to "backing out" as the tool applies torque to a screw fastener which consist in shot peening the bit end, scoring the bit end with parallel lines extending substantially at right angles to the axis of the shank, then heat treating in a neutral salt at least the bit end of the tool, and then shot peening the bit end.

References Cited in the file of this patent
UNITED STATES PATENTS

| | | |
|---|---|---|
| 1,899,489 | Wickbergh | Feb. 28, 1933 |
| 2,116,775 | Blackburn | May 10, 1938 |
| 2,231,009 | Holt | Feb. 11, 1941 |
| 2,328,869 | Wilkie | Sept. 7, 1943 |
| 2,380,385 | Buffum | July 31, 1945 |